United States Patent [19]

Mertens et al.

[11] Patent Number: 5,188,337
[45] Date of Patent: Feb. 23, 1993

[54] CONTROL VALVE WITH PRESSURE EQUALIZATION

[75] Inventors: Klaus Mertens, Hemsbach; Andreas Sausner, Frankfurt, both of Fed. Rep. of Germany

[73] Assignee: Carl Freudenberg, Weinheim/Bergstr., Fed. Rep. of Germany

[21] Appl. No.: 788,981

[22] Filed: Nov. 7, 1991

[30] Foreign Application Priority Data

Dec. 13, 1990 [DE] Fed. Rep. of Germany ....... 4039766

[51] Int. Cl.⁵ .............................................. F16K 31/06
[52] U.S. Cl. ................................ 251/129.17; 251/282; 251/359
[58] Field of Search ............... 251/129.17, 282, 359

[56] References Cited

U.S. PATENT DOCUMENTS

| | | | |
|---|---|---|---|
| 3,606,241 | 9/1971 | Bornholdt | 251/129.17 X |
| 4,010,769 | 3/1977 | Lorenzo et al. | 251/129.17 X |
| 4,582,294 | 4/1986 | Fargo | 251/282 X |
| 4,624,285 | 11/1986 | Perach | 251/129.17 X |

Primary Examiner—Arnold Rosenthal
Attorney, Agent, or Firm—Felfe & Lynch

[57] ABSTRACT

A control valve for fluid media has an adjusting piston which is displaceable by a drive and whose face end can be seated against a valve seat. The adjusting piston and the drive are disposed in a valve housing which is completely filled with fluid. The adjusting piston is formed by a hollow body through which fluid can flow on both sides in the direction of its axis, and the hollow body surrounds a cavity. The cavity is sealed by a first sealing member extending transversely of its axis against the valve housing, and by a second sealing member which extends against a dividing wall which is contained in the cavity and is displaceable in a direction of the axis. The valve housing is filled on one side of the first and second sealing member facing away from the valve seat with an incompressible hydraulic protective fluid.

13 Claims, 4 Drawing Sheets

FIG. 4

CONTROL VALVE WITH PRESSURE EQUALIZATION

FIELD OF THE INVENTION

This invention relates to a novel control valve for fluids, said valve comprising an adjusting piston mounted in a valve housing, said piston being slidably displaceable by a drive and having a face which can be applied against a valve seat, the valve housing being completely filled with fluid.

BACKGROUND OF THE INVENTION

Control valves of this kind are generally known. For instance, mushroom-type valves which can be actuated from outside by drives are used to control the fluid flow in lines of an internal combustion engine. Mushroom valves consist of a valve stem and axial adjacent valve plate, usually made of solid material. For example, the valves are mounted in lines through which fluid flows and fluid can flow around them. Moreover, spring means can be associated with the valves to assist the drives.

It should be noted, however, that the forces for the actuation of the valves vary because of different levels of pressure, in a cooling system, for example. Furthermore, sealing the adjusting mechanism against aggressive fluids containing impurities causes additional problems.

OBJECT OF THE INVENTION

It is an object of the present invention to provide a control valve of the type referred to above, which incorporates a substantial improvement of the accuracy of adjustment of the valve and at the same time provides improved protection of the adjusting mechanism against aggressive media, wear and impurities.

Other objects and advantages of the present invention will become apparent as the description thereof proceeds.

DESCRIPTION OF THE INVENTION

The above object is achieved in accordance with the present invention by a control valve comprising an adjusting piston formed by a hollow body through which fluid can flow on both sides in the direction of its axis and around a cavity. The body is sealed against the valve housing by a first sealing member extending transversely of its axis and sealed against a divider displaceable in the direction of the axis by a second sealing member extending transversely of its axis, the valve housing forming a closed chamber on the side of the first and second sealing member facing away from the valve seat, the chamber being filled with an incompressible hydraulic protective fluid. By virtue of the arrangement of the sealing elements and the divider, the adjusting mechanism of the hollow body is protected against aggressive substances in the cooling circuit, as well as against wear, contamination, corrosion and freezing at low temperatures.

The first sealing member as well as the second sealing member can be formed by a diaphragm. Advantageously, the first and second sealing members are formed by a gasket merging integrally with one another. If the sealing members are in the form of a diaphragm, the diaphragm can be in the form of a rolling diaphragm, for example. Diaphragms have the advantage that they offer especially low resistance to the adjusting mechanism. The diaphragm is affixed to the housing depending upon the pressure distribution and direction of movement of the flowing medium. A one-piece diaphragm is simpler to install, offers greater reliability with respect to resistance to leakage, and is more economical to manufacture.

A two-piece design of the diaphragm may also be used. In this case a first diaphragm is mounted between the housing and the outer circumference of the hollow body, and a second diaphragm is mounted on the inner circumference of the hollow body. If the contact surfaces are properly prepared, a gasket can also be used instead of the diaphragm along the outer circumference, but because of the increased friction and the greater wear of such an arrangement, the positioning accuracy and useful life of the control valve are significantly impaired.

The first sealing member as well as the second sealing member can be constituted by a bellows. These sealing members can also be designed as a single-piece continuous element or in two separate pieces. Bellows also offer the advantage of greater ease of movement in the direction of movement of the hollow body, and offer greater stability and stiffness in the radial direction. Bellows can be equipped with stiffeners which further increase their useful life.

The dividing wall inside of the hollow body can also be constituted by a piston. A piston, which must be sealed by a gasket along the inner circumference of the hollow body, has a longer useful life and provides slightly greater friction.

The piston can be constituted by a stiffening plate which is affixed to the second sealing member. In this case it is advantageous that the diaphragm does not assume a parabolic shape. Consequently, the piston can move axially over comparatively long distances without the diaphragm colliding with the ends of the body or becoming damaged. The structural length of the hollow body in the axial direction can therefore be shortened. Moreover, the stiffening plate reduces the mechanical stress on the diaphragm and increases its useful life.

A perforated plate ma be situated in front of the hollow body at the end facing the valve seat. The equalization of a particular pressure can be controlled by the distribution of the pressure at the perforated plate by the size, number and position of the holes in the perforated plate.

The valve seat may be adjustable in the direction of movement of the hollow body and locked on the valve seat housing. The adjustable valve seat allows for a precise coordination of the position of the valve seat with respect to the length of movement of the hollow body by the adjusting mechanism. This arrangement permits a simple replacement of the adjustable valve seat, combined with a simple adjustment of the valve seat with respect to the hollow body, largely independently of the nature of the housing.

Spring means having different spring characteristics may be associated with the hollow body at both axial ends thereof. By using springs with different spring characteristics, it is possible to economically manufacture thermostat valves of largely similar construction which will open or close a passage without involving the actuating force of the adjusting mechanism. For example, if the adjusting mechanism of the hollow body fails, it should automatically shift to a safer position for the protection of the components connected to the valve. In the cooling circuit of an internal combustion engine, for example, the bypass line should be closed and the cooling line opened. The two valves then differ only with respect to their different spring elements.

The springs may be helical springs. Their advantages are simplicity of installation and low cost. An electromagnetic drive may be associated with the hollow body, which permits especially simple operation of the control valve in both directions. A spring is unnecessary if the servomotor operates perfectly, but for safety purposes it may be associated with the hollow body so that if the drive mechanism breaks down, the valve can be shifted to the best position for preventing damage to the connected machine.

BRIEF DESCRIPTION OF THE DRAWINGS

The novel control valve of the present invention will be further illustrated with the aid of the attached drawings which show the control valve as part of a cooling system, wherein FIG. 4 shows the control valve with one diaphragm, two springs and an adjustable valve seat.

DESCRIPTION OF PREFERRED EMBODIMENTS

Figure 1:
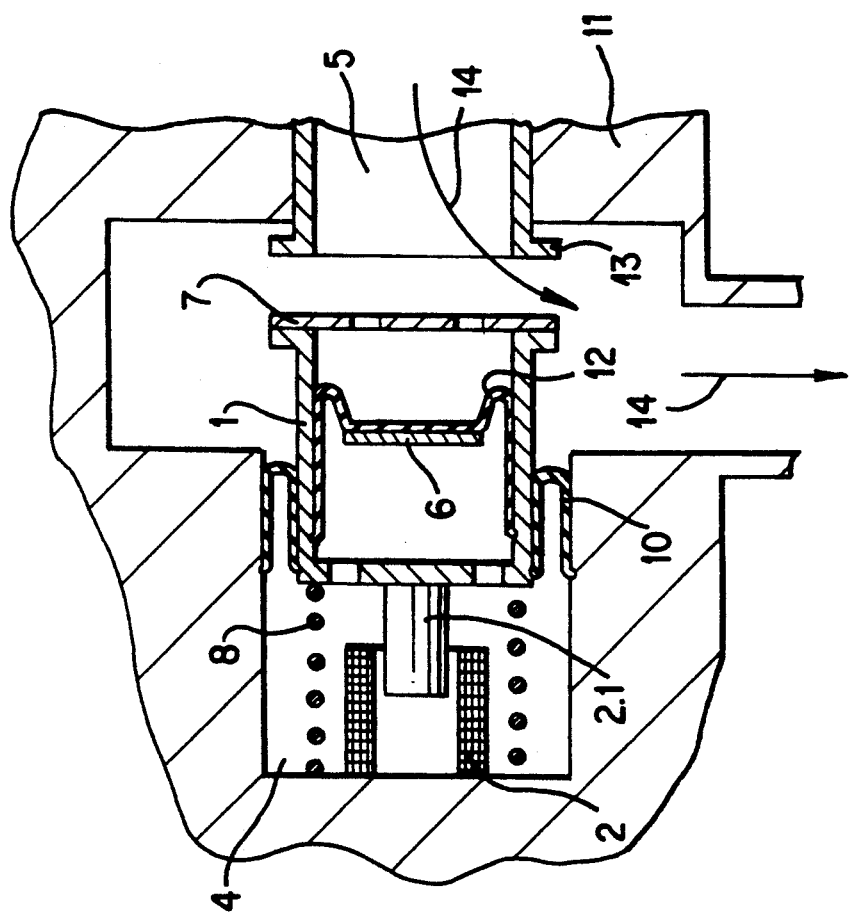
FIG. 1 shows the control valve with two diaphragms and a spring.

Referring to FIG. 1, the control valve consists essentially of a hollow body 1, an outer circumferential diaphragm 10 which is disposed between the outer circumference of hollow body 1 and the valve housing 11, an inner circumferential diaphragm 12 which is fastened to the inner circumference of hollow body 1, and an adjusting mechanism 2 for the actuation of the hollow body 1. Without the actuation force of the driving mechanism, such as an electromagnet 2 and armature 2.1, the hollow body would be driven to the closed position against the valve seat 13 by the resilient force of spring 8 in pressure equalizing chamber 4. The outer circumferential diaphragm 10 and the inner circumferential diaphragm separate the pressure equalizing chamber, through which no fluid flows, from the space 5 through which fluid does flow. The direction of flow 14 of the fluid is indicated by arrows.

A perforated plate 7 may be placed at the head of the hollow body 1 facing the space 5 in the axial direction. In addition to pressure equalization, a protective fluid in the pressure equalizing chamber 4 provides for effective protection of the driving mechanism 2 against wear, contamination, corrosion and impairment of operation by low temperatures. The cooling system pressure is applied to the inner circumferential diaphragm 12 on the side facing chamber 5 and the diaphragm transfers this pressure essentially through the inner circumferential diaphragm 12 to the pressure equalizing chamber 4. Because of the incompressible protective fluid in chamber 4, the volume of the pressure equalizing chamber 4 remains virtually constant, even if the pressure varies in the cooling system. If the same pressure prevails on both sides of the inner circumferential diaphragm 12 (pressure equalization), the hollow body 1 needs only to be operated against mechanical forces such as the friction forces and, if springs 8 are present, against the spring forces. Because of the pressure equalization, only very low variable hydraulic pressure forces act upon the driving mechanism 2 of the hollow body 1, so that great driving accuracy is achieved. When the hollow body 1 moves in the axial direction, the inner circumferential diaphragm 12 with the stiffening plate 6 changes position only very slightly relative to the valve housing 11 because of the incompressibility of the pressure equalizing medium.

Figure 2:
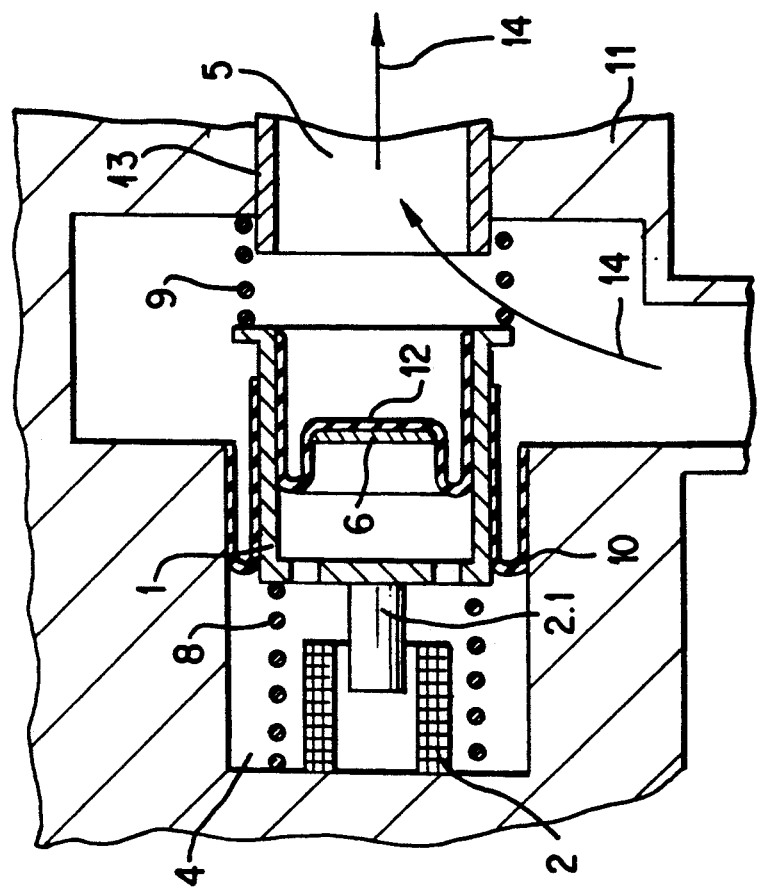
FIG. 2 shows the control valve with two diaphragms and two spring.

FIG. 2 shows another embodiment of the control valve of the present invention which differs from that shown in FIG. 1 by the fact that spring means 8 and 9 with different characteristics are disposed in the axial direction on both sides adjacent to the hollow body 1. This control valve can be used both as "open when driving mechanism is not active" and "closed when driving mechanism is not active."

For this variant in which the valve is to be forced open or held in the open position because of a defective driving mechanism, for example, the spring 9 in chamber 5 must have a slightly greater spring force, even when the valve is open, than spring 8 which is located in the pressure equalizing chamber 4. This condition is applicable, for example, if the control valve in the open position releases a cooling circuit; a defective driving mechanism 2 would then not result in a thermally overloaded or damaged machine. For the situation in which the control valve has to be forced into or held in the closed position if the drive mechanism fails, the spring 8 located in the pressure equalizing chamber must have a greater spring force, even with the valve closed, than the spring 9 located in chamber 5. Such a device could be used, for example, as a bypass control valve in a cooling system. In case of a breakdown, the bypass circuit is closed and the coolant flows through the cooling circuit without danger of overheating or damage to the machine. In the embodiment shown in FIG. 2, it is especially advantageous that, by the simple exchange of springs 8 and 9, with otherwise the same control valve construction, all possible applications can be covered. Even the opening characteristics of the control valve can be modified.

The principle of operation of the pressure equalization in the embodiment of FIG. 2 is the same as that in FIG. 1. Because of the change in the pressure ratios in this example, and the resulting change in the direction of flow 14 of the coolant, a different mounting of the diaphragms 10 and 12 makes sense.

Figure 3:
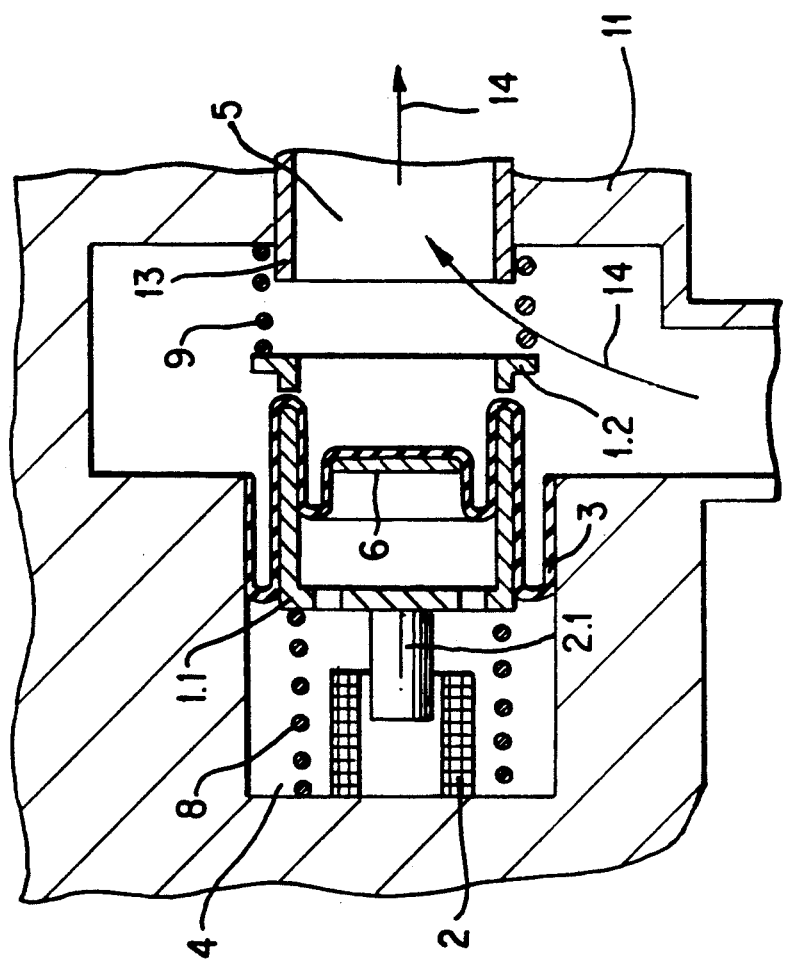
FIG. 3 shows the control valve with one diaphragm and two springs.

FIG. 3 shows a further embodiment of the control valve according to the present invention which differs from the embodiments of FIGS. 1 and 2 in that the seal 3 between pressure equalization chamber 4 and chamber 5 through which the fluid medium flows is made in a single piece. The seal can be formed by diaphragms or bellows or both. In addition to easier, less expensive manufacturing, the single piece seal 3 also has the advantage of greater sealing reliability. The two-piece hollow body 1.1, 1.2 is held together against the reaction force of the drive mechanism 2 by the force of at least one spring. The length of seal 3 and the points at which it is fastened to the hollow body 1 are to be selected in accordance with FIGS. 1 to 3 in relation to the length of the movement of the hollow body and the direction 14 in which the fluid medium flows.

Figure 4:
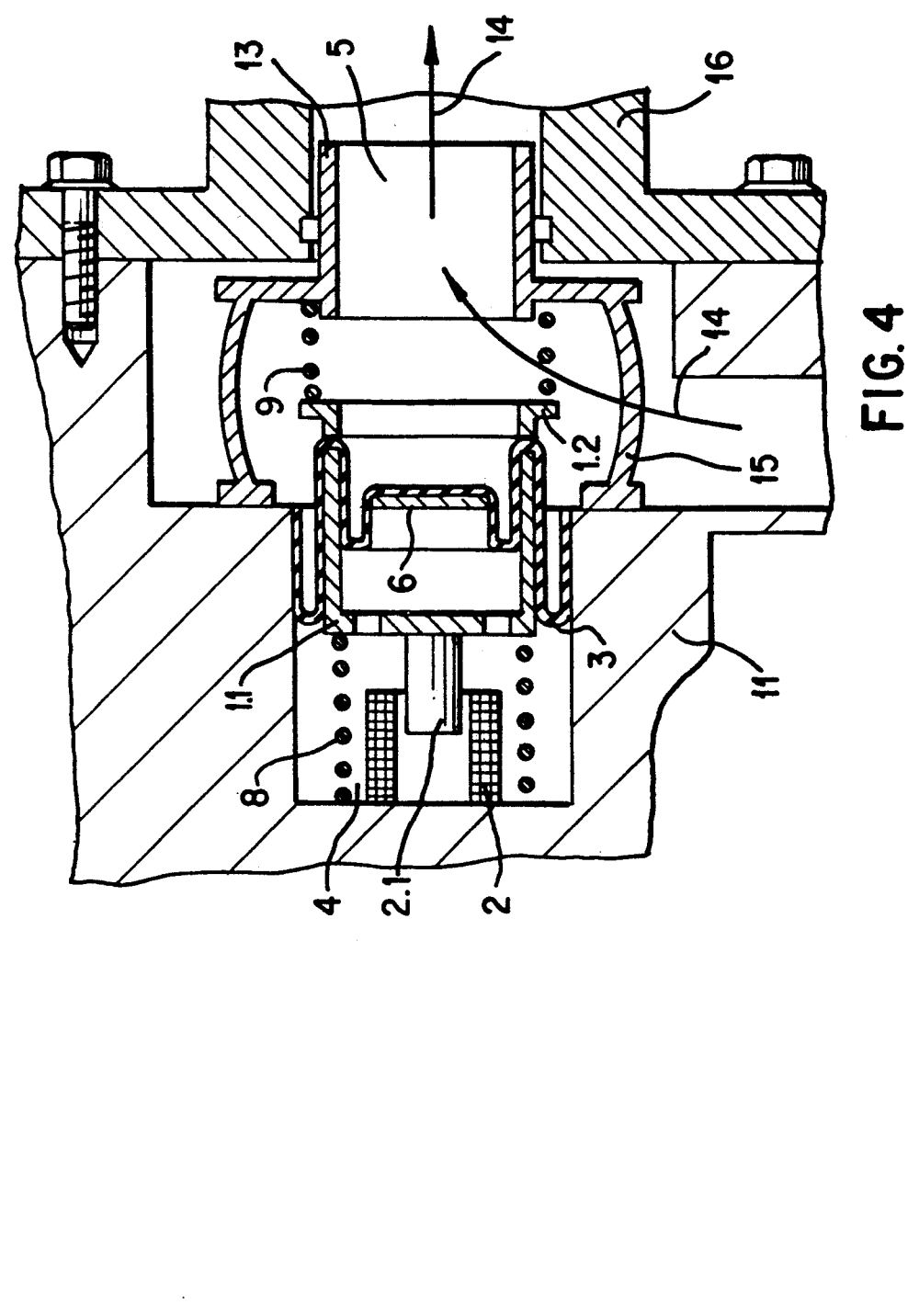

FIG. 4 shows an embodiment similar to the control valve of FIG. 3, but with an adjustable valve seat which can be brought into position relative to the hollow body 1 largely independently of the housing in which it is contained. The adjustable valve seat 13 is fastened to the valve housing 11. The adjustment is performed, for example, by arms 15 affixed to the adjustable valve seat 13, which precisely establish the distance between the hollow body 1 and the valve seat 13. This control valve construction is advantageous with respect to the replacement of the adjustable valve seat. Furthermore, the adjustment of the valve seat 13 is largely independent of the manufacturing tolerances of the adjoining circuit housing 16.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A flow control valve for a fluid medium comprising
   a housing having a valve seat,
   a hollow piston defining a cavity therein, said piston being movable in said housing along an axis toward and away from said valve seat,
   a dividing wall transverse to said axis in said cavity, said dividing wall being movable along said axis relative to said piston,
   first sealing means between said piston and said housing,
   second sealing means between said piston and said dividing wall,
   a closed chamber formed by said housing, said piston, said dividing wall, and said first and second sealing means opposite from said valve seat, said closed chamber having an incompressible hydraulic fluid therein, and
   adjusting means for controlling the position of said piston relative to said valve seat.

2. A flow control valve as in claim 1 wherein said first sealing means is a diaphragm fixed to said housing and said piston.

3. A flow control valve as in claim 1 wherein said first and second sealing means are diaphragms which are integrally formed from a single piece of material.

4. A flow control valve as in claim 1 wherein said second sealing means comprises a diaphragm fixed to said piston and said dividing wall.

5. A flow control valve as in claim 4 wherein said diaphragm extends completely across said cavity, said dividing wall being a plate fixed to said diaphragm.

6. A flow control valve as in claim 1 further comprising a perforated plate fixed to said piston and facing said valve seat.

7. A flow control valve as in claim 1 further comprising means for adjusting the position of the valve seal relative to the housing along the axis of movement of the piston.

8. A flow control valve as in claim 1 further comprising first spring means urging said piston toward said valve seat.

9. A flow control valve as in claim 7 further comprising second spring means urging said piston away from said valve seat, said first and second spring means having different spring characteristics.

10. A flow control valve as in claim 9 wherein said first and second spring means comprise respective first and second helical springs.

11. A flow control valve as in claim 1 wherein said adjusting means comprises an electromagnetic drive.

12. A flow control valve as in claim 11 wherein said electromagnetic drive comprises a servomotor.

13. A flow control valve as in claim 1 wherein said adjusting means is located in said closed chamber.

* * * * *